(12) United States Patent
Haruno et al.

(10) Patent No.: US 10,177,610 B2
(45) Date of Patent: Jan. 8, 2019

(54) STATOR

(71) Applicant: TOYOTA JIDOSHA KABUSHIKI KAISHA, Toyota-shi, Aichi-ken (JP)

(72) Inventors: Kentaro Haruno, Toyota (JP); Tomohiko Miyamoto, Nagakute (JP); Tatsuo Nagashima, Anjo (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 242 days.

(21) Appl. No.: 15/112,556

(22) PCT Filed: Jan. 16, 2015

(86) PCT No.: PCT/IB2015/000033
§ 371 (c)(1),
(2) Date: Jul. 19, 2016

(87) PCT Pub. No.: WO2015/110890
PCT Pub. Date: Jul. 30, 2015

(65) Prior Publication Data
US 2016/0336819 A1    Nov. 17, 2016

(30) Foreign Application Priority Data
Jan. 22, 2014  (JP) .................................. 2014-009092

(51) Int. Cl.
| | |
|---|---|
| *H02K 1/04* | (2006.01) |
| *H02K 1/14* | (2006.01) |
| *H02K 3/32* | (2006.01) |
| *H02K 15/12* | (2006.01) |
| *H02K 3/52* | (2006.01) |

(52) U.S. Cl.
CPC ............... *H02K 1/04* (2013.01); *H02K 1/146* (2013.01); *H02K 3/325* (2013.01); *H02K 3/522* (2013.01); *H02K 15/12* (2013.01); *H02K 2203/12* (2013.01)

(58) Field of Classification Search
CPC .......... H02K 3/522; H02K 1/04; H02K 1/146; H02K 3/325; H02K 15/12
USPC .................. 310/194, 214–215, 216.008, 254
See application file for complete search history.

(56) References Cited

U.S. PATENT DOCUMENTS 7,969,273 B2 *  6/2011  Urano .................... H02K 3/522
                                                      336/198
2013/0113332 A1 *  5/2013  Saito ...................... H02K 3/522
                                                      310/214

FOREIGN PATENT DOCUMENTS

| CN | 103026590 A | | 4/2013 |
|---|---|---|---|
| JP | 2010213544 A | * | 9/2010 |
| JP | 2010-246269 A | | 10/2010 |
| JP | 2012-060795 A | | 3/2012 |

\* cited by examiner

*Primary Examiner* — Jeremy A Luks
(74) *Attorney, Agent, or Firm* — Sughrue Mion, PLLC

(57) ABSTRACT

A stator includes a stator core, an insulating body, a coil, and a resin-molded product. The stator core includes a circumferentially side surface and an axially upper surface. The insulating body includes a side wall and an upper wall. The side wall covers the circumferentially side surface of the stator core. The upper wall covers the axially upper surface of the stator core. A radially inner side end surface of the upper wall is positioned farther toward a radially outer side than a radially inner side end surface of the side wall. The resin-molded product covers the coil.

2 Claims, 5 Drawing Sheets

STATOR

BACKGROUND OF THE INVENTION

1. Field of the Invention

The invention relates to technology related to a stator used in a rotary electric machine such as an electric motor or a generator.

2. Description of Related Art

A stator has a structure in which a stator coil (hereinafter, simply referred to as a coil) is wound around a stator core. An insulating body may be arranged between the stator core and the coil to insulate them from each other. For example, molten resin may be filled around the coil to fix the position of the coil such that the coil is covered by a resin-molded product formed when the molten resin harden.

Japanese Patent Application Publication No. 2010-246269 (JP 2010-246269 A) describes technology for assembling a stator to an insulating body formed in advance. Japanese Patent Application Publication No. 2012-60795 (JP 2012-60795 A) describes technology for injection forming an insulating body around a stator core. A coil is wound along a side surface of the stator core in the circumferential direction, as well as upper and lower surfaces in the axial direction. Therefore, with both of these technologies, the insulating body is provided with a side wall that covers the side surface of the stator core in the circumferential direction, and an upper wall that covers the upper surface of the stator core in the axial direction.

When a coil is covered with a resin-molded product formed by filling molten resin around a coil wound along a circumferentially side wall and an axially upper wall of an insulating body, the molten resin flows, toward the upper surface along the circumferentially side wall of the stator core, and crosses the boundary between the circumferentially side wall and the axially upper surface, after which the molten resin fills the space above the upper wall of the insulating body and the axially upper surface of the stator core. At this time, air tends to mix in with the molten resin, so there tends to be voids (bubbles) in the resin-molded product. If there are voids in the resin-molded product, cracks tend to form from the voids, and portions of the resin-molded product tend to peel away due to the cracks. The resultant scrapings may affect the operation of the rotary electric machine.

SUMMARY OF THE INVENTION

One aspect of the invention relates to a stator that includes a stator core, an insulating body, a coil, and a resin-molded product. The stator core includes a circumferentially side surface and an axially upper surface. The insulating body includes a side wall and an upper wall. The side wall covers the circumferentially side surface of the stator core. The upper wall covers the axially upper surface of the stator core. A radially inner side end surface of the upper wall is positioned farther toward a radially outer side than a radially inner side end surface of the side wall. The resin-molded product covers the coil.

With the stator described in this specification, a void is inhibited from occurring in the resin-molded product that covers the coil, so a decrease in strength of the resin-molded product is able to be avoided. Also, portions of the resin-molded product will not easily peel off, so the reliability and durability of the rotary electric machine is able to be improved.

The details, and further improvements, of the technology described in this specification, will be described in detail in example embodiments of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 4:
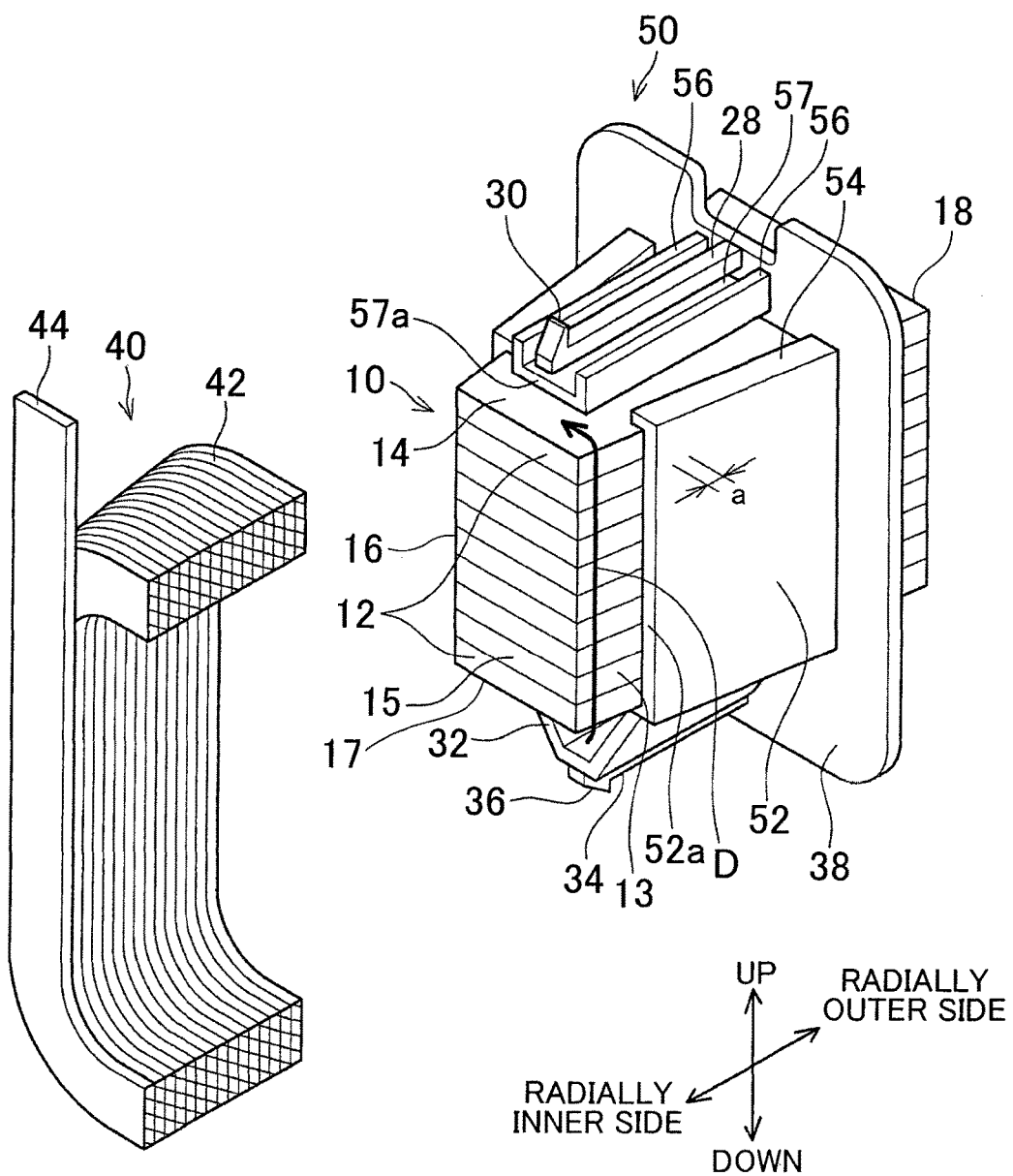
FIG. 4 is an exploded perspective view of a related stator (one tooth)

The cause of voids occurring in the resin-molded product was researched with a stator having the structure described below. FIG. 4 is an exploded perspective view of a stator core 10, an insulating body 50, and a stator coil 40 (hereinafter, referred to simply as "coil") described in JP 2010-246269 A. The stator core 10 is part of a stator core that is on the whole annular in shape. Only one tooth is partially shown. Also, only the left half of the coil 40 is shown. The insulating body 50 includes a side wall 52 that covers a side surface of the stator core 10 in a circumferential direction, and upper walls 54 and 57 that cover an upper surface of the stator core 10 in an axial direction. The upper surface of the stator core 10 contacts a lower surface of the upper wall 54 that extends from the side wall 52, and a lower surface of the upper wall 57 that is formed between a pair of vertical walls 56. A radially inner side surface of the stator core 10 is not covered by the insulating body 50. A radially inner side end surface 52a is formed on the side wall 52, and a radially inner side end surface 57a is also formed on the upper wall 57. With the technology described in JP 2010-246269 A the radially inner side end surface 57a of the upper wall 57 is positioned to the radially inner side of the radially inner side end surface 52a of the side wall 52 by a distance a.

The coil 40, the insulating body 50, and the stator core 10 are assembled together with the insulating body 50 inserted inside of the coil 40. Then, molten resin is filled around the coil 40. The molten resin flows from down to up along the side surface of the stator core 10, as indicated by arrow D in FIG. 4. In this specification, the upstream side of the molten resin that flows along the side surface of the stator core will be referred to as "down" or "lower", and the downstream side will be referred to as "up" or "upper". The characteristics shown in FIG. 4 that are not described above will be described by the items of the example embodiment. In FIGS. 1 to 3 and 4, members denoted by like reference characters are considered to be like members.

It is evident that an air mixing phenomenon intensifies when the radially inner side end surface 57a of the upper wall 57 is positioned to the radially inner side of the radially inner side end surface 52a of the side wall 52. Conversely, it is evident that the flow of molten resin becomes smoother and the air mixing phenomenon is inhibited when the radially inner side end surface 57a is positioned to the radially outer side of the radially inner side end surface 52a. The stator described in this specification includes a stator core, an insulating body, a coil, and a resin-molded product, with the coil being covered, by the resin-molded product. A plurality of coils are arranged in an annular shape, and the stator has an annular shape. The insulating body includes a side wall that covers a circumferentially side surface of the stator core, and an upper wall that covers an axially upper surface of the stator core. The radially inner side end surface of the upper wall is positioned to the radially outer side of the radially inner side end surface of the side wall. With this kind of structure, the flow of molten resin is smoother, so the air mixing phenomenon is inhibited. The number of voids that occur in the resin-molded product that covers the coil are able to be minimized.

The insulating body described above may be a member manufactured separately from the stator core, or a member that is injection molded around the stator core. In the case of the former, one insulating body may correspond to one tooth, or a plurality of the members may be combined to form an insulating body corresponding to one tooth. Alternatively, one insulating member may correspond to a plurality of coils. Also, one coil 40 may be covered by a resin-molded product D, or a plurality of coils 40 may be covered by one resin-molded product D. That is, each coil 40 may be covered by a resin-molded product D before the coils 40 are arranged in an annular shape, or a plurality of coils 40 may be covered by a resin-molded product D after they have been arranged in an annular shape.

An outline of another structure of the example embodiment will now be described. A notch is formed in an upper wall of the insulating body that contacts the axially upper surface of the stator core 10. The cutout is a portion that is surrounded by end surfaces 24e and 24f that will be described later, and in which a portion of the upper wall of the insulating body is recessed to the radially outer side. A hook 30 that prevents the coil 40 from moving toward the radially inner side by engaging with the coil 40 is formed on an upper portion of the notch. When the hook 30 engages with the coil 40, the hook 30 must be temporarily displaced downward. The hook 30 is able to be displaced downward without interfering with the upper wall because the notch is formed in the upper wall of the insulating body.

Figure 1:
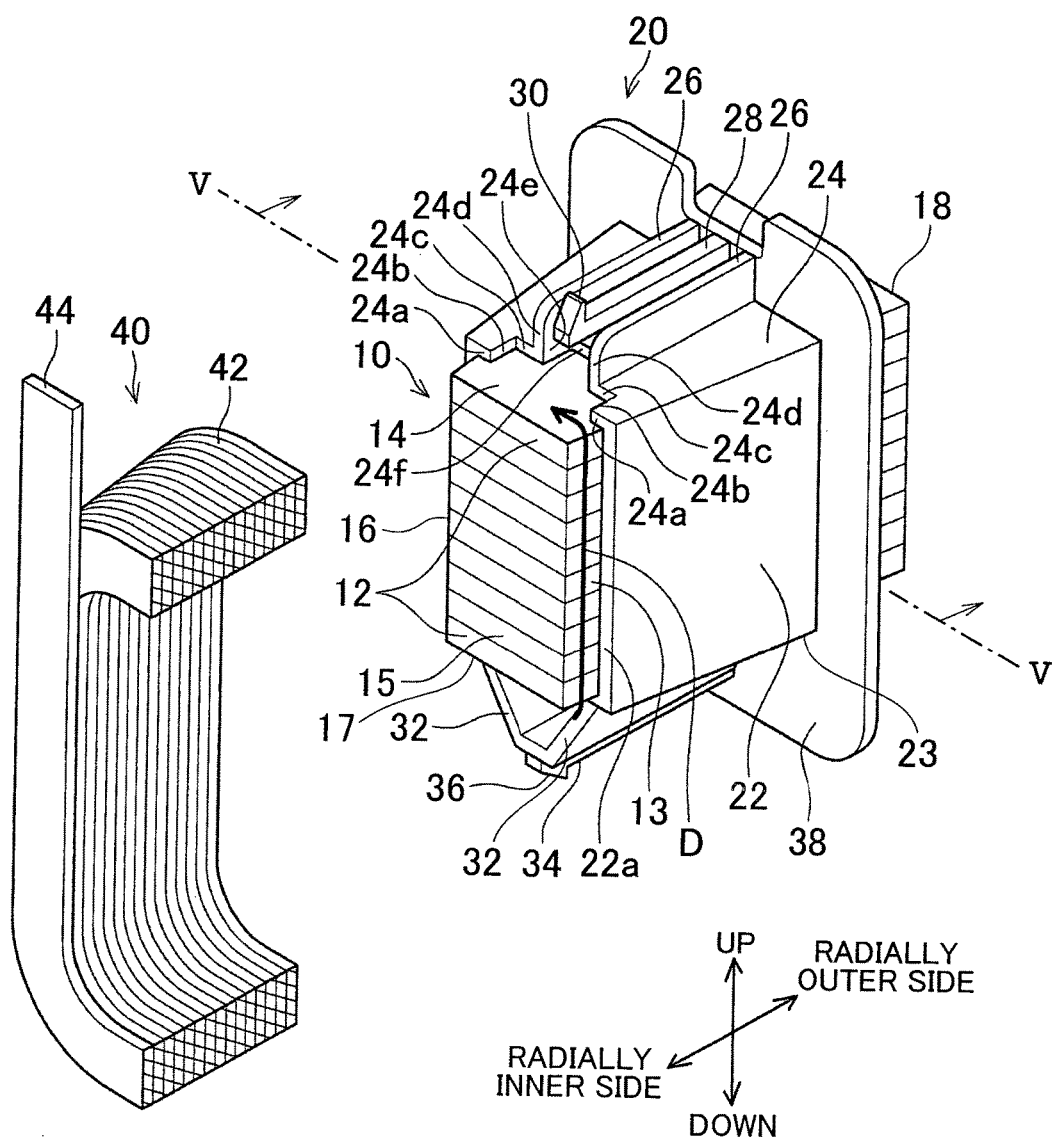
FIG. 1 is an exploded perspective view of a stator (one tooth) according to an example embodiment of the invention.

In FIG. 1, reference character 10 denotes a stator core in which a plurality of electromagnetic steel plates 12 are stacked in the vertical direction. The stator core 10 includes a near-side side surface 13 (a side surface in the circumferential direction), an upper surface 14 (an upward surface on axis in FIG. 1), a far-side side surface 16 (a side surface in the circumferential direction), a lower surface 17 (a surface in the downward direction on the axis in FIG. 1), a radially inner side end surface 15, and a radially outer side end surface 18. The distance between the side surface 13 and the side surface 16 becomes larger farther toward the radially outer side.

Figure 2:
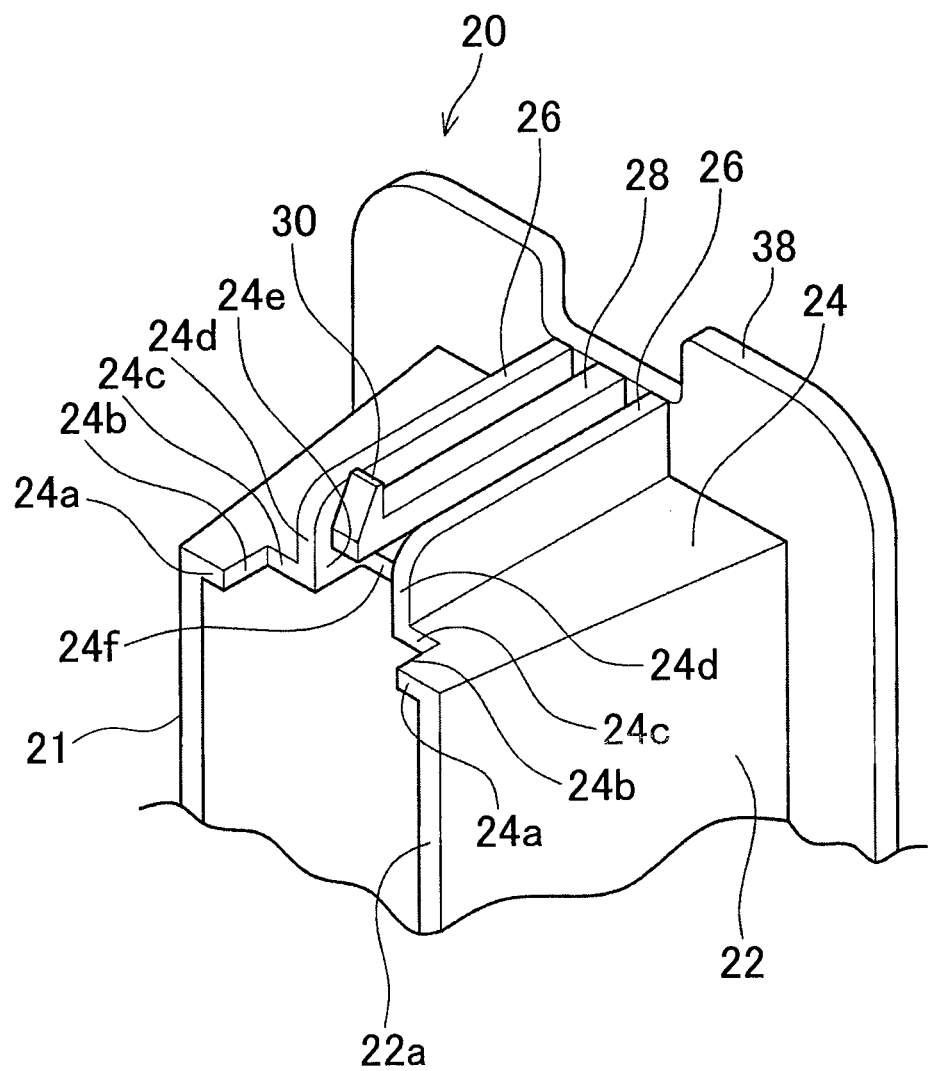
FIG. 2 is a perspective view of an area near a side wall and an upper wall of an insulating body.
Figure 3:
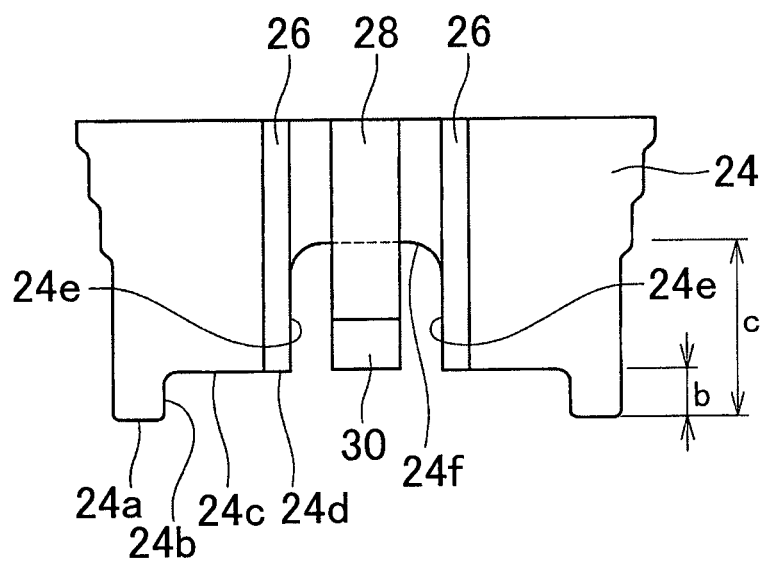
FIG. 3 is a plan view of the upper wall of the insulating body.

Reference FIG. 20 denotes an insulating body, which is formed separately from the stator core 10 in this example embodiment. The insulating body 20 may also be formed injection-molded around the stator core 10. The insulating body 20 includes a near-side side wall 22 that contacts and covers the side surface 13 of the stator core, an upper wall 24 that contacts and covers the upper surface 14, a far-side side wall 21 that contacts and covers the side surface 16, a lower wall 23 that contacts the lower surface, and a rear wall 38. A notch is formed in the upper wall 24 when viewed from above in a plan view. The details will be described below and are shown in FIGS. 1 to 3. FIG. 2 is a perspective view of only the insulating body 20, and FIG. 3 is a plan view of the upper wall 24 of the insulating body 20. A radially inner side end surface 24a of the upper wall 24 is on the same plane as a radially inner side end surface 22a of the side wall 22. The end surface of the upper wall 24 changes direction from the end surface 24a toward the radially outer side and is continuous with a radially inner side end surface 24c. An end surface 24b is an end surface that extends in the radial direction between the end surface 24a and the end surface 24c. A pair of vertical walls 26 are formed on an upper surface of the upper wall 24. Between this pair of vertical walls 26, the radially inner side end surface 24f of the upper wall 24 is positioned even farther toward the radially outer side than the end surface 24c is. The end surface 24e is an end surface that extends in the radial direction between the end surface 24c and the end surface 24f. A radially inner side end surface 24d of the vertical walls 26 is in the same plane as the end surface 24c. Some of the radially inner side end surfaces, i.e., the end surfaces 24c, 24d, and 24f, of the upper wall 24 are positioned farther to the radially outer side than the end surface 22a of the side wall 22. The end surfaces 24c and 24d are positioned farther toward the radially outer side than the end surface 22a by a distance b, and the end surface 24f is positioned farther toward the radially outer side than the end surface 22a by a distance c.

An engaging wall, 28 extends between the pair of vertical walls 26, and the hook 30 is formed on a tip end of this engaging wall 28. Space is provided between a lower surface of the engaging wall 28 and the upper surface of the upper wall 24, so the engaging wall 28 is able to bend downward. The coil 40 is able to be assembled to the insulating body 20 while the engaging wall 28 bends downward. When the coil 40 is assembled farther to the radially outer side than the hook 30, the hook 30 engages with the coil 40. The hook 30 prevents the coil 40 from being displaced to the radially inner side of the insulating body 20. The hook 30 is able to be displaced downward without interfering with the upper wall 24 because a notch that is surrounded by the end surfaces 24e and 24f is formed in the upper wall 24 of the insulating body 20.

Also, a pair of leg portions 32 extend from the lower wall of the insulating body 20, and an engaging ridge 34 runs along the peak of these leg portions 32. A hook 36 is also formed on a tip end of this engaging ridge 34. An opening through which the stator core 10 passes is formed in the rear wall 38.

The stator core 10 (tooth) is inserted into the insulating body 20 from the radially outer side of the rear wall 38. Consequently, the circumferentially side surface of the stator core 10 closely contacts the side wall 22 of the insulating body 20, and the axially upper surface of the stator core 10 closely contacts the upper wall 24 of the insulating body 20. Next, the coil 40 is moved from the radially inner side to the outer side. The inner side surface of the coil 40 is positioned by the side wall 22 of the insulating body 20, the inner lower surface of the coil 40 is positioned by the engaging ridge 34 of the insulating body 20, and the inner upper surface of the coil 40 is positioned by the engaging wall 28 of the insulating body 20. The position of the coil 40 in the radial direction is restricted by the rear wall 38 and the hooks 30 and 36.

Figure 5:
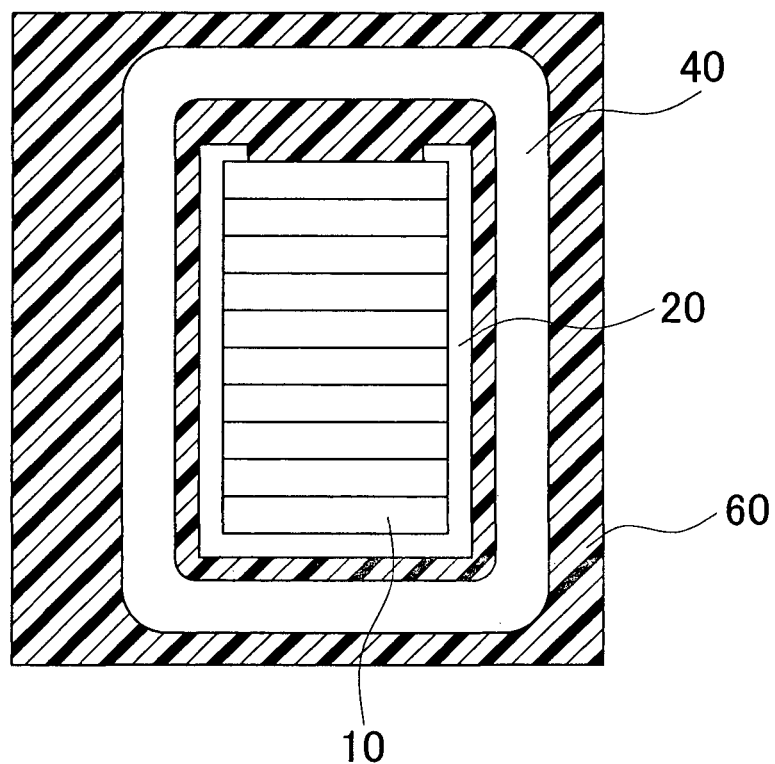
FIG. 5 is a sectional view taken along line V-V of the stator in FIG. 1.

When the stator core 10, the insulating body 20, and the coil 40 are assembled, this assembly is placed in a die and molten resin is filled around the coil 40, such that the coil 40 is covered by a resin-molded product D. As a result, the shape of the coil 40 is fixed, and the positional relationship between the coil 40 and the insulating body 20 is fixed. The molten resin flows from down to up along the side surface 13 of the stator core 10, as indicated by arrow D. The molten resin that has reached the upper surface 14 of the stator core 10 fills the remaining space above the upper surface 14, and molten resin that has reached the upper surface of the upper wall 24 of the insulating body 20 fills the remaining space above the upper wall 24. FIG. 5 is a sectional view of the stator taken along line V-V in FIG. 1. The molten resin is denoted by reference character 60. At this time, when the radially inner end surfaces 24c, 24d, and 24f of the upper wall 24 are positioned to the radially outer side of the radially inner side end surface 22a of the side wall 22, as shown in FIG. 1, air is able to be inhibited from mixing in with the molten resin that flows in and mixes with the air remaining above the upper surface 14 and the upper wall 24. Thus, voids are inhibited from forming in the resin-molded product D formed by the molten resin hardening.

As described above, when molten resin is filled in around the coil 40 and the coil 40 is covered by the resin-molded product D, the position relationship between the radially inner side end surface 22a of the side wall 22 and the radially inner side end surface of the upper wall is extremely important. As shown in FIG. 4, if the end surface 57a of the upper wall is positioned farther toward the radially inner side than the end surface 52a of the side wall, the resin-molded product D will have a lot of voids. In contrast, if the end surfaces 24c, 24d, and 24f of the upper wall are positioned farther toward the radially outer side than the end surface 22a of the side wall as shown in FIG. 1, a resin-molded product D with few voids is able to be formed. According to the technology described in this specification, an actual situation in which a portion of the resin-molded product D peels off is able to be prevented from occurring, so the durability and reliability of the rotary electric machine is able to be increased. It is particularly effective when the insulating body 20 provided with the hook 30 and the notch (i.e., the portion surrounded by the end surfaces 24e and 24f) that enables the hook 30 to bend is used.

Heretofore, specific examples of the technology described in the specification have been described in detail, but these are merely examples, and the invention is not limited to these examples. The invention also includes various modifications of the specific examples described above. Also, the technical elements illustrated in the specification and the drawings display technical utility both alone and in various combinations. Further, the technology illustrated in the specification and the drawings simultaneously achieves a plurality of objects, and has technical utility by simply achieving one of these objects.

The invention claimed is:

1. A stator comprising:
   a stator core including
      a circumferentially side surface, and
      an axially upper surface;
   an insulating body including
      a side wall that covers the circumferentially side surface of the stator core, and
      an upper wall that covers the axially upper surface of the stator core, a radially inner side end surface of the upper wall being positioned farther toward a radially outer side than a radially inner side end surface of the side wall, wherein
      the insulating body further includes a hook, and
      the insulating body defines a notch recessed from the radially inner side end surface of the upper wall of the insulating body the notch being positioned in a direction in which the hook bends;
   a coil; and
   a resin-molded product that covers the coil.

2. The stator according to claim 1, wherein a tip end of the hook is displaceable into the notch.

* * * * *